United States Patent
Urquhart

(10) Patent No.: US 7,260,410 B2
(45) Date of Patent: Aug. 21, 2007

(54) APPARATUS FOR MONITORING THE ENVIRONMENT OF A PERSON BY TELEPHONE

(76) Inventor: Marty Urquhart, 411 Lynrose Ct., King of Prussia, PA (US) 19406

( * ) Notice: Subject to any disclaimer, the term of this patent is extended or adjusted under 35 U.S.C. 154(b) by 107 days.

(21) Appl. No.: 10/988,806

(22) Filed: Nov. 15, 2004

(65) Prior Publication Data

US 2006/0105786 A1    May 18, 2006

(51) Int. Cl.
*H04Q 7/20* (2006.01)

(52) U.S. Cl. .............. 455/456.5; 455/456.1; 340/573.4

(58) Field of Classification Search .......... 455/419, 455/550.1, 426.2, 414.1, 456.5, 456.1; 375/316; 717/168; 340/573.1, 573.4
See application file for complete search history.

(56) References Cited

U.S. PATENT DOCUMENTS

| | | | |
|---|---|---|---|
| 5,119,072 A | 6/1992 | Hemingway | 340/573 |
| 5,640,147 A * | 6/1997 | Chek et al. | 340/573.4 |
| 6,035,217 A | 3/2000 | Kravitz | 455/561 |
| 6,072,392 A * | 6/2000 | Henderson et al. | 340/539.15 |
| 6,218,945 B1* | 4/2001 | Taylor, Jr. | 340/573.1 |
| 6,239,715 B1 | 5/2001 | Belton | 340/691.3 |
| 6,278,370 B1 | 8/2001 | Underwood | 340/573.1 |
| 6,396,403 B1 | 5/2002 | Maner | 340/573.4 |
| 6,593,851 B1 | 7/2003 | Bornstein | 340/539.15 |
| 6,728,341 B1 | 4/2004 | Puchek et al. | 379/49 |
| 2004/0185895 A1* | 9/2004 | Aisenberg | 455/550.1 |
| 2005/0070271 A1* | 3/2005 | Lie et al. | 455/426.2 |
| 2005/0083195 A1* | 4/2005 | Pham et al. | 340/539.13 |

* cited by examiner

*Primary Examiner*—Joseph Feild
*Assistant Examiner*—Michael Vu
(74) *Attorney, Agent, or Firm*—Michael F. Petock, Esq.; Petock & Petock, LLC

(57) ABSTRACT

An apparatus for monitoring the environment of a person from any dialable telephone includes a small transmitter/receiver which is attached to the person whose environment is to be monitored. The transmitter/receiver contains cellular/wireless/mobile electronics and programming and may be dialed similarly to the dialing of any cellular phone. The transmitter/receiver is provided with an automatic answer means which enables connection between the cellular/wireless/mobile network and the transmitter/receiver without intervention from the person whose environment is to be monitored. In a preferred embodiment, a password would be required to enhance privacy. The transmitter/receiver automatically disconnects when the caller ends the call.

6 Claims, 1 Drawing Sheet

APPARATUS FOR MONITORING THE ENVIRONMENT OF A PERSON BY TELEPHONE

FIELD OF THE INVENTION

The present invention relates to an apparatus for monitoring the environment of a person by telephone. More particularly, the present invention relates to an apparatus for monitoring the environment of a person by telephone where the device may be accessed by any telephone anywhere for the period of a telephone call wherein audio sounds in the environment of the person may be monitored.

BACKGROUND OF THE INVENTION

There is a need for persons to be able to check on and monitor the sounds in the environment of a loved one who may be very young, very old or otherwise infirm and in the care of others.

Efforts have been made in this area in the past. For example, U.S. Pat. No. 5,640,147—Chek et al. discloses a child monitoring device which requires the parent or guardian to have a special device to generate an enabling signal to enable a monitoring device on a child. Chek et al. requires the parent or person who is doing the monitoring to have special equipment.

SUMMARY OF THE INVENTION

The present invention provides an apparatus for monitoring the environment of a person by any telephone anywhere. The monitoring device of the person being monitored includes means in the form of a device using cellular/wireless/mobile technology with an assigned telephone number and either software or hardware to automatically answer a call from any telephone, whether land line, cellular/wireless/mobile or otherwise, and to transmit audio sounds in the environment back to the monitoring telephone for so long as the telephone remains connected to the cellular/wireless/mobile device on the child or other infirm person.

In accordance with another aspect of the present invention, the cellular/wireless/ mobile device on the child or other person to be monitored may be provided with a pass code, which must be entered by the caller before monitoring of the child or infirm person's environment may take place. Throughout, the reference to cellular device includes cellular, wireless and mobile technologies which transmit and receive telephone like messages at an assigned telephone number via electromagnetic waves without a wire connection to the telephone network, such as transmissions which may take place between a tower or other transmitter/receiver and the cellular device.

Briefly and basically, in accordance with the present invention, an apparatus for monitoring the environment of a person is comprised of a receiver/transmitter for receiving a cellular/wireless/mobile telephone signal from a cellular/wireless/mobile network and transmitting a signal to a cellular/wireless/mobile network. The receiver/transmitter is provided with means for attachment to a person whose environment is to be monitored. The receiver/transmitter includes means for automatically connecting to an incoming call and disconnecting when the incoming call ends. The receiver/transmitter includes a microphone for converting audio sounds from its immediate environment into an electric current for transmission on the signal transmitted to the cellular/wireless/mobile network and the receiver/transmitter is accessible by any telephone on any publicly switched telephone network to connect to the receiver/transmitter and to monitor the audio environment of the person being monitored.

In a preferred embodiment, the receiver/transmitter may include means for requiring the entry of a password from the received telephone signal from the cellular/wireless/mobile network before enabling the microphone for transmission of audio signals from the environment.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF PREFERRED EMBODIMENTS

Figure 1:
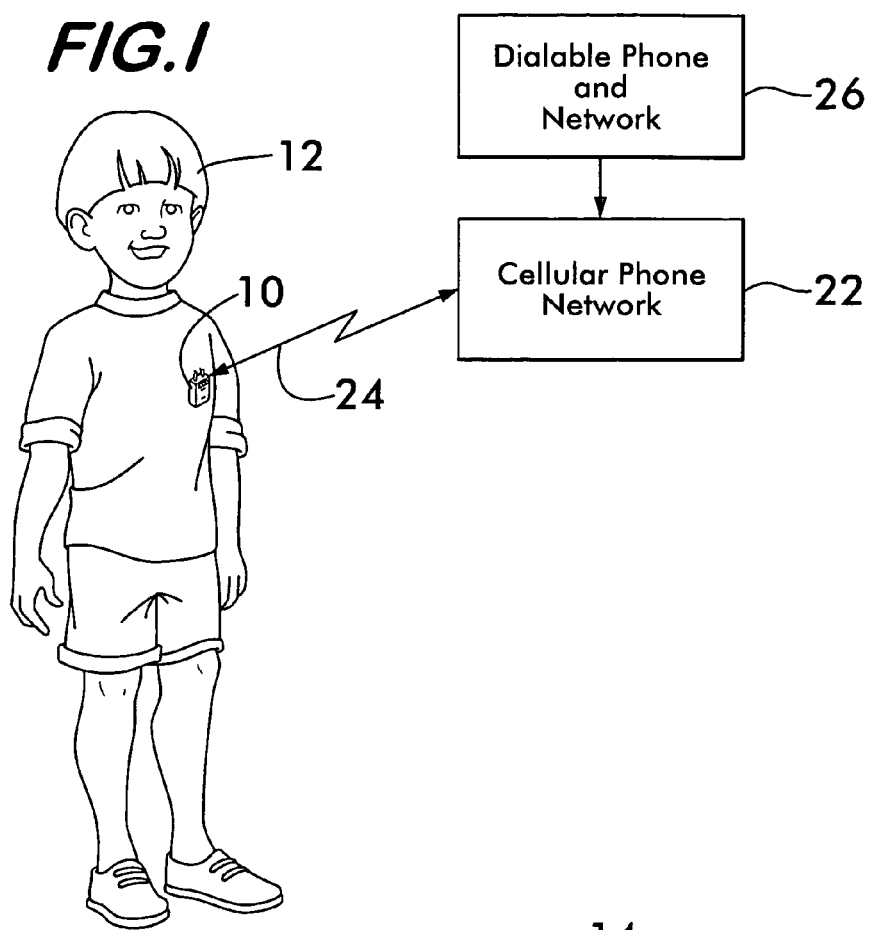
FIG. 1 is an elevation view, partially in block diagram, of the apparatus of the present invention.

Referring now to the drawings, wherein like numerals indicate like elements, there is shown the apparatus of the present invention which includes a transmitter/receiver 10 which may be attached to a person 12 whose audible sounds in the environment are to be monitored. Person 12 may be any person who requires monitoring, but may typically be a small child, such as a toddler in day care, an elderly person or any other infirm person who may be in the care of others.

Figure 2:
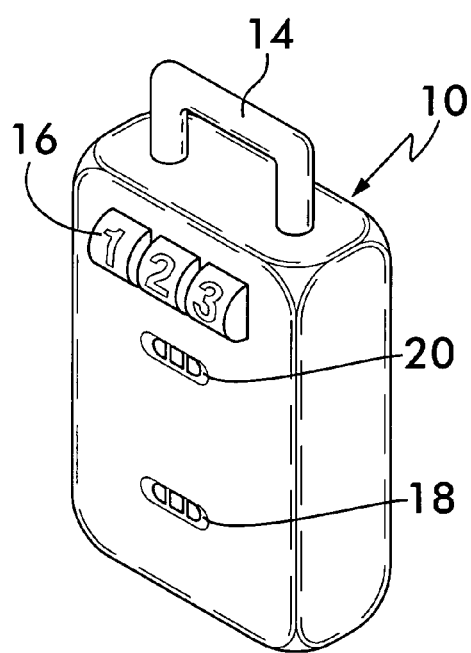
FIG. 2 is a view in perspective of the apparatus of the present invention.

Referring now to FIGS. 1 and 2 together, transmitter/receiver 10 may be attached to clothing of person 12 by an attachment pin or other attachment means 14. Attachment means 14 may be any suitable attachment means and the pin or hook may be any suitable shape. Preferably, as illustrated in FIG. 2, attachment pin 14 would be provided with a closed lockable loop controlled by some lockable means such as combination lock 16 illustrated in FIG. 2. Other locking means may be utilized, including, but not limited to, a key or electronic code.

Transmitter/receiver 10 is provided with a microphone 18 for picking up audio or audio frequency sounds in its immediate environment. Transmitter/receiver 10 is also provided with a speaker 20 for transmission of received sounds or communications to the person 12.

Transmitter/receiver 10 may be provided with cellular phone device circuitry and programming which is capable of receiving a signal or call from a cellular phone network 22. Again, cellular phone network or cellular phone device includes all types of cellular, wireless, personal wireless service and mobile service. The term cellular is used herein to cover all of these. In other words, transmitter/receiver 10 would be provided with standard cellular phone circuitry and programming wherein transmitter/receiver 10 may be dialed and connected to the cellular phone network just like any cellular telephone. Upon receiving a signal corresponding to the telephone number of the cellular device of transmitter/receiver 10, transmitter/receiver 10 is provided with automatic answer means in the form of either circuitry or programming. However, although not required, in a presently preferred embodiment, transmitter/receiver in the form of a cellular device would include means for requiring the entry of a pass code after it is accessed by dialing its cellular telephone number. This means may either be provided by circuitry or by programming. Preferably, the password may be changed to customize to each particular user's preference. In that manner, it may be customized so that it is easy for the users to remember the pass code, but difficult for someone else to guess it.

Once transmitter/receiver 10 is accessed by a cellular telephone network, either directly or through a password, and the automatic answer feature is activated, usually after the first ring, transmitter/receiver 10 may via microphone 18 convert audio sound from its immediate environment into an electric current for transmission on the signal back to the cellular network. The link between transmitter/receiver 10 and cellular phone network 22 is illustrated by double headed arrow 24. In this manner, anyone calling transmitter/receiver 10, if no password is required, may listen to audio sounds in the environment of person 12. The sounds may detect whether person 12 is crying, or provide other indications of the well being or lack of well being of person 12. Anyone calling transmitter/receiver 10 may also talk to person 12 via speaker 20. In the case of transmitter/receiver 10 requiring a password, the same operation may be conducted once the password is entered.

Transmitter/receiver 10 is also provided with means for disconnecting or turning off when the incoming call from the cellular network ends. In this manner, the caller has complete control of turning transmitter/receiver 10 on with the incoming call through the automatic answer feature and ending the call by merely hanging up on the caller's end. No special equipment is required to be possessed by the caller. The means for the automatic answering and the means for the automatic ending of the call may be circuitry and/or programming within cellular device transmitter/receiver 10. This circuitry and/or programming is well known in the cellular phone art.

Calls may be originated to transmitter/receiver 10 from any dialable phone. This may include any cellular phone on cellular phone network 22 or any other phone which may access the cellular phone network through its own network. For example, dialable land line phones can call any cellular phone. Such dialable phones and networks are indicated by box 26 in FIG. 1. Accordingly, transmitter/receiver 10 may be accessed by any phone anywhere by merely dialing the phone number assigned to transmitter/receiver's cellular device circuitry. In this manner, a small child left in day care may be monitored by the parents from any phone in their office or any location without any difficulty. If privacy is desired, a password may be assigned so that the password must be dialed in after the cellular phone number is dialed, but before access to transmitter/receiver 10 will be granted.

It is presently preferred that transmitter/receiver 10 would be a small device, preferably, but not necessarily, no more than 1½ inches tall, 1 inch wide and ¾ of an inch deep. However, it is understood that various other dimensions may be utilized in practicing the present invention.

The present invention may be embodied in other specific forms without departing from the spirit or essential attributes thereof and, accordingly, reference should be made to the appended claims, rather than to the foregoing specification as indicating the scope of the invention.

I claim:

1. An apparatus for monitoring the environment of a person, comprising:

a housing having a pinlike lockable attachment means for attachment to a garment of a person whose environment is to be monitored;

a receiver/transmitter within said housing for receiving a cellular/wireless/mobile telephone signal from a cellular/wireless/mobile network and transmitting a signal to a cellular/wireless/mobile network;

said receiver/transmitter including means for automatically connecting to an incoming call and disconnecting when the incoming call ends;

said receiver/transmitter including a microphone for converting audio sound from its immediate environment into an electric current for transmission on the signal transmitted to said cellular/wireless/mobile network;

said receiver/transmitter being accessible by any telephone on any publicly switched telephone network to connect to said receiver/transmitter and to monitor the audio environment of the person to be monitored; and said receiver/transmitter being provided with no means to initiate an outgoing call.

2. An apparatus for monitoring the environment of a person in accordance with claim 1 wherein said receiver/transmitter includes means for requiring the entry of a password from the received cellular/wireless/mobile telephone signal from the cellular/wireless/mobile network after said receiver/transmitter is accessed and before enabling said microphone for the transmission of audio signals from the environment.

3. An apparatus for monitoring the environment of a person in accordance with claim 1 wherein said cellular/wireless/mobile network is accessible from any dialable telephone.

4. An apparatus for monitoring the environment of a person in accordance with claim 1 wherein said pinlike lockable attachment means includes a combination lock.

5. An apparatus for monitoring the environment of a person in accordance with claim 1 wherein said pinlike lockable attachment means includes a keylock.

6. An apparatus for monitoring the environment of a person in accordance with claim 1 wherein said pinlike lockable attachment means includes an electronic lock.

* * * * *